Figure 1:
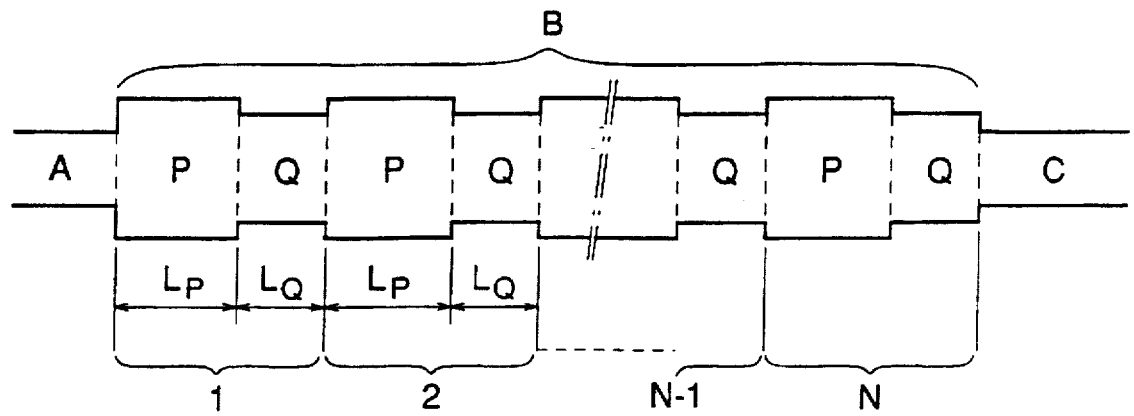

United States Patent [19]
Pedersen

[11] Patent Number: 5,703,977
[45] Date of Patent: Dec. 30, 1997

[54] INTEGRATED OPTICAL MODE CONVERTER

[75] Inventor: Jørgen Werngreen Pedersen, Delft, Netherlands

[73] Assignee: Koninklijke PTT Nederland N.V., Groningen, Netherlands

[21] Appl. No.: 659,117

[22] Filed: Jun. 4, 1996

[30] Foreign Application Priority Data

Jul. 7, 1995 [NL] Netherlands ............................ 1000759

[51] Int. Cl.$^6$ .............................................. G02B 6/26
[52] U.S. Cl. ............................. 385/28; 385/14; 385/131
[58] Field of Search .................................... 385/28, 15, 46, 385/1, 2, 146, 16, 14, 11, 50, 45, 23, 129, 130, 131

[56] References Cited

U.S. PATENT DOCUMENTS

| | | | |
|---|---|---|---|
| 5,185,828 | 2/1993 | Van Der Tol | 385/28 |
| 5,243,669 | 9/1993 | Alferness et al. | 385/111 |
| 5,285,507 | 2/1994 | Van Der Tol | 385/28 |
| 5,574,808 | 11/1996 | Van Der Tol | 385/28 |

FOREIGN PATENT DOCUMENTS

| | | |
|---|---|---|
| 0 513 919 A1 | 11/1992 | European Pat. Off. . |
| 0 645 650 A1 | 3/1995 | European Pat. Off. . |

OTHER PUBLICATIONS

A New Approach to Polarization Independent Integratged Optical Circuits: The Bimodal Polarization Converter, Optical Fiber Conference (OFC '97) Feb. 16–20, 1997, Dallas, Texas.

Film Mode Matching: A Versatile Numerical Method for Vector Mode Field Calculations in Dielectric Waveguides, A.S. Sudbo, Journal of Pure and Applied Optics, vol. 2, 1993, pp. 211–233.

J.J.G.M. van der Tol et al; "New Short and Low–Loss Passive Polarization Converter on InP"; Jan. 1995; pp. 32–34; IEEE Photonics Technology Letters; No. 1, New York.

H.G. Unger; "Planar Optical Waveguides and Fibres"; 1977; Oxford University Press, Oxford, England.

J.W. Pedersen et al; "Mode Converting Polarization Splitter On InGaAsP/InP"; Sep. 25–29, 1994; 20th European Conference on Optical Communication (ECOC '94); Firenze, Italy; pp. 661–664.

J.W. Pedersen et al; "Low Loss Passive Polarisation Splitter on InP/InGaAsP By Use of Mode Conversion"; Feb. 23–25, 1995, Dana Point, California; 1995 Technical Digest Series, vol. 7; Integrated Photonics Research; pp. 165–167.

Primary Examiner—John Ngo
Attorney, Agent, or Firm—Frishauf, Holtz, Goodman, Langer & Chick

[57] ABSTRACT

Integrated optical mode converter provided with a channel-shaped waveguide comprising a periodic concatenation of two wave-guiding subsections (P) and (Q) defined by a strip-shaped structure supported by a substrate. The waveguide profiles of the subsections (P) and (Q) are defined by two different partial strips, of which at least one is, but preferably both are, provided with a slot ($S_P$, $S_Q$) running in a longitudinal direction of the partial strip in question. The slots have been applied in such a manner that only the field distribution of one of the two guided modes involved in the mode conversion is affected. The resulting structure has increased conversion per interface; and lower attenuation in specific embodiments.

31 Claims, 11 Drawing Sheets

1

INTEGRATED OPTICAL MODE CONVERTER

A. BACKGROUND OF THE INVENTION

The invention lies in the area of the conversion of guided modes of light waves in integrated optical components. More in particular, the invention relates to a mode converter for the conversion of a fraction of a signal component propagating according to a first guided mode of a light signal in a signal component propagating according to a second guided mode, with one of the two guided modes having an even order number and the other of the two guided modes an odd order number, comprising a channel-shaped waveguide supported by a substrate, in which a periodic coupling takes place between said guided modes of the light signal propagating in the waveguide, which waveguide comprises an incoming wave-guiding section, an intermediary wave-guiding section and an outgoing wave-guiding section, with the intermediary wave-guiding section having a periodic geometric structure including a periodic concatenation of two wave-guiding subsections per period, with the lengths of the subsections and the number of periods corresponding to said fraction of conversion.

Reference [1](see under C., References) discloses such passive converters, not only for conversions between guided modes having different order numbers, but also between guided modes having the same order number. The converting effect is based on symmetry of the interfaces between the various consecutive wave-guiding sections which, due to a suitable choice of the lengths of the subsections, are situated at such mutual distances that a positive interference is possible between the subfractions converted in each interface of a specific guided mode. The degree of conversion in an interface is expressed by a coupling factor, also referred to as coupling coefficient or coupling constant. As this coupling factor becomes greater, a smaller number of interfaces may suffice to obtain a desired fraction of conversion between two specific guided modes, while the total length of the converter is correspondingly smaller. For an integrated version of such a mode converter, the required symmetry of the interfaces is preferably realised by width differences of the various consecutive sections, or by allowing consecutive sections having the same profile to connect to one another with an offset. Such discontinuities in lateral direction are relatively simple to manufacture. In addition such a discontinuity, as it becomes greater, supplies a greater coupling factor in lateral direction. A drawback, however, is that every lateral discontinuity in a waveguide, as this becomes greater, is generally accompanied by greater transmission losses (excess loss).

Reference [2]describes passive polarisation converters which, as far as the coupling factor and the transmission losses are concerned, are improved variants of the mode converters disclosed in reference [1]. An increase of the coupling factor has been achieved by not choosing rectangular but various trapezium shapes for the strip-shaped elements which determine the waveguide profiles of the two consecutive wave-guiding subsections. As a result, the converter has angled facets as it were, it being possible to choose the facet angle in such a manner that a good compromise between the height of the coupling factor and the size of the transmission losses may be achieved. Such facet angles may be constructed with the help of a wet-chemical etching process, though always corresponding to a chosen crystal orientation. As a result, the choice of the facet angle is limited, however, and an optimum facet angle is hard to realise when it does not fit the crystal orientation.

Reference [3]discloses a polarisation splitter based on mode conversion, which applies a specific mode converter of the type referred to above—in this case a 100% $TM_{00} \rightarrow TM_{01}$ converter—in combination with a mode filter constructed as an adiabatic asymmetric Y-junction. The mode converter in this polarisation splitter, which is realised on InGaAsP/InP, makes use of a relatively large lateral offset between each pair of consecutive waveguide sections in the converter, with the coupling factor being relatively high, and the number of interfaces therefore being relatively low. As a result, the length of the converter is relatively short. The size of the transmission losses, however, is relatively high.

Reference [4]describes a similar polarisation splitter, in which the 100% $TM_{00} \rightarrow TM_{01}$ mode converter—also realised on InGaAsP/InP—due to a relatively small lateral offset does show low transmission losses, though at the expense of a lower coupling factor and a correspondingly greater length.

B. SUMMARY OF THE INVENTION

The object of the invention is to provide mode converters of the type referred to above having a relatively high coupling factor per interface with respect to the known mode converters at a relatively low attenuation.

For this purpose, the invention presents a mode converter of the type referred to above, wherein at least one of the two wave-guiding subsections has a waveguide profile including a partial profile which has a deforming effect on a field distribution of one of the two guided modes and does not substantially affect a field distribution of the other one of the two guided modes. The invention is based on the insight that in a bimodal, and more generally in a multimodal channel-shaped, laterally limited waveguide realised in a thin transparent layer on a substrate, the field distributions of guided modes having an even and an odd order number differ characteristically. Thus, a light signal propagating in such a waveguide according to a guided mode having an even order number, viewed transversely to the direction of propagation, has a field distribution showing an extreme value (maximum or minimum) around the centre of the waveguide profile of such waveguide, while a guided mode having an odd order number has a zero in the centre. This signifies that in the rough geometry of a channel-shaped waveguide, which determines the waveguide profile, modifications may be applied, which determine a partial profile of the total waveguide profile, in such a manner that said partial profile, at any rate substantially, only affects the field distribution of guided modes having either the even order or the odd order. Simulations have demonstrated that application of such modifications to the geometry of at least one of the two subsections in the intermediary wave-guiding section of the mode converter has a favourable effect on the coupling factor in relation to the attenuation per interface. In integrated form, accepted channel-shaped waveguides of types such as "raised strip", "embedded strip", "rib guide" and "strip-loaded guide", are defined by strip-shaped elements. In a preferred embodiment of the mode converter, each of the two subsections has a waveguide profile which is substantially determined by a strip-shaped element, and at least one of the strip-shaped elements is provided with a slot running according to a longitudinal direction of the strip-shaped element in question.

Further preferred embodiments are directed to a further reduction of the attenuation per interface may.

A further object of the invention is to provide a method for manufacturing a channel-shaped waveguide on a substrate comprising a light-conducting layer, which waveguide comprises a concatenation of wave-guiding sections alternating with a first and a second waveguide profile mainly defined by strip-shaped elements, of which strip-shaped elements at least one is provided with a slot-shaped recess, which method comprises the following steps:

(a) applying to the substrate a first mask pattern of mask material, which first mask pattern comprises mask parts corresponding to the strip-shaped elements of the first and the second type, and to the slots running in the strip-shaped elements of at least one of the two types, (b) etching, in a first etching operation, parts of the substrate not covered by mask material, (c) covering up mask parts of the first mask pattern, which correspond to the slots running in the strip-shaped elements of at least one of the two types, having a second mask pattern of mask material, (d) etching, in a second etching operation, parts of the substrate not covered by mask material.

C. REFERENCES

[1] EP-A-0513919;

[2] EP-A-0645650;

[3] J. W. Pedersen et al.: "Mode converting polarization splitter on InGaAsP/InP", Proc. Europ. Conf. Optical Communication (ECOC), Firenze, Italy, September 1994, paper We.C.2.2, pp. 661–664;

[4] J. W. Pedersen et al.: "Low loss passive polarization splitter on InP/InGaAsP by use of mode conversion", Integrated Photonic Research, February 1995, Technical Digest Series, Vol. 7, pp. 165–167;

[5] H. -G. Unger, "Planar optical waveguides and fibres", Clarendon Press, Oxford 1980, cpt 3 'Planar guides with transverse confinement', and more particularly sections 3.2, 3.3 and 3.4;

[6] A. S. Sudbo, Journ. of Pure and Applied Optics, Vol. 2, 1993, pp. 211–233.

All references are considered to be incorporated in the present application

D. BRIEF DESCRIPTION OF THE DRAWINGS

Figure 2:
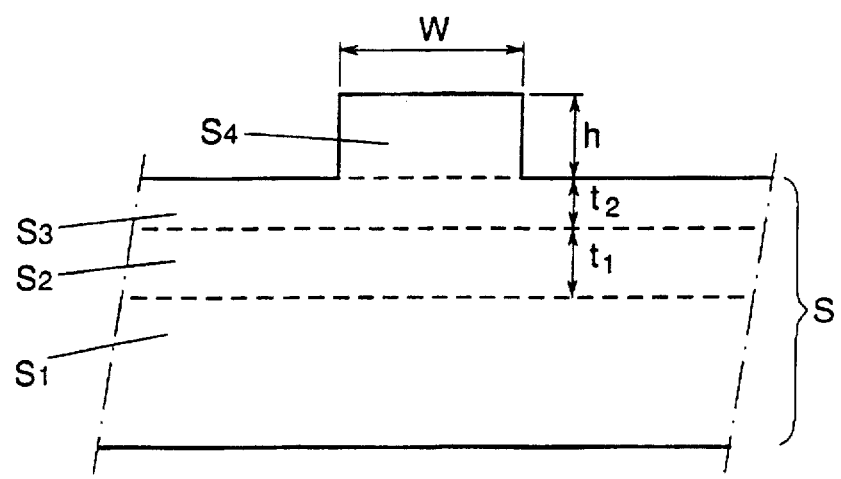
Figure 3A:
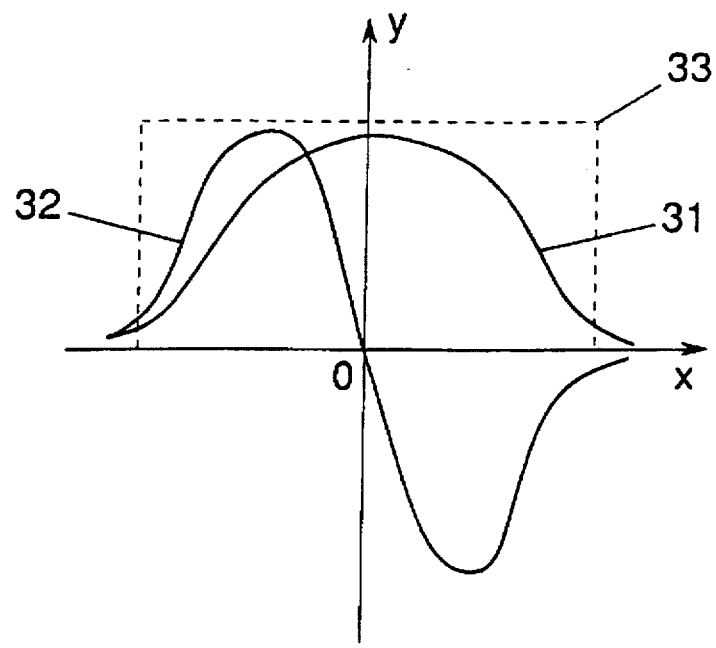
Figure 3B:
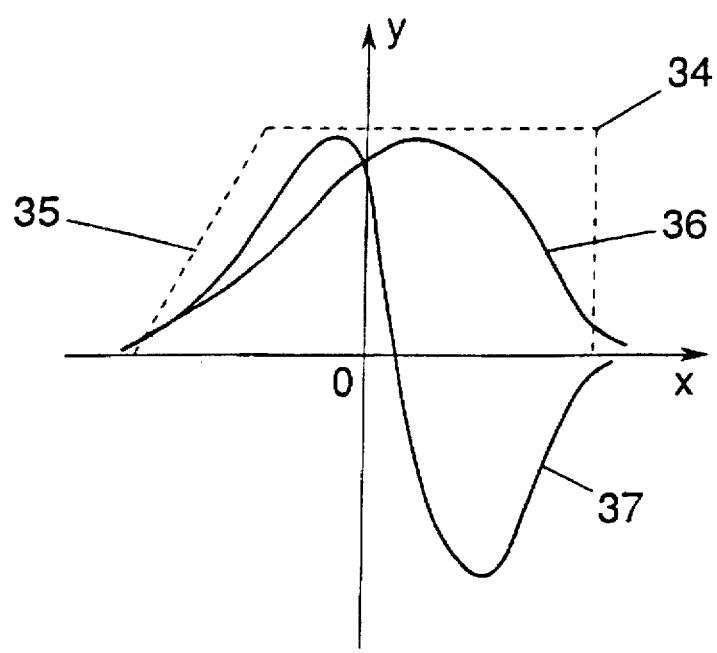
Figure 4:
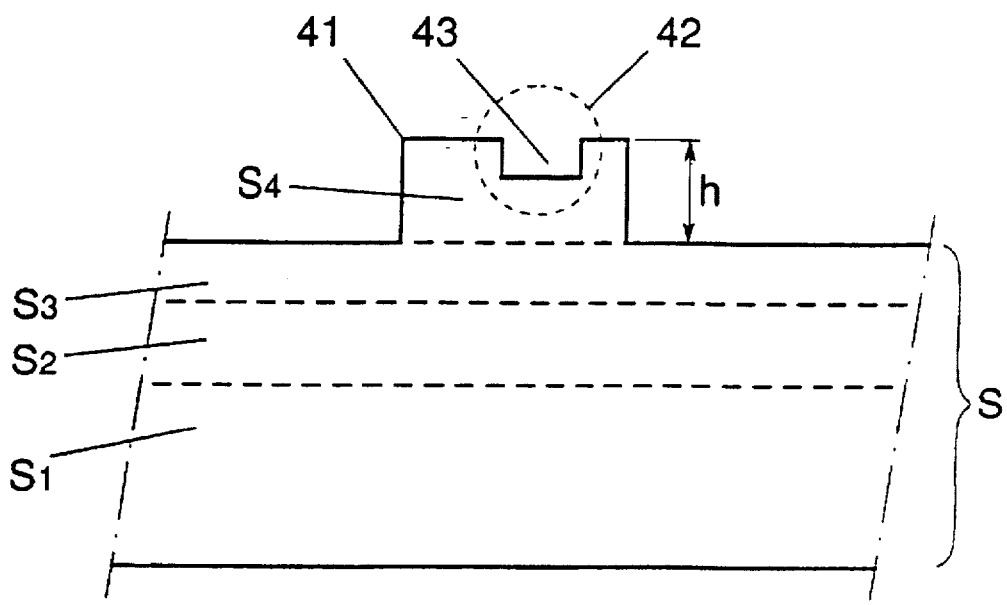
Figure 10:
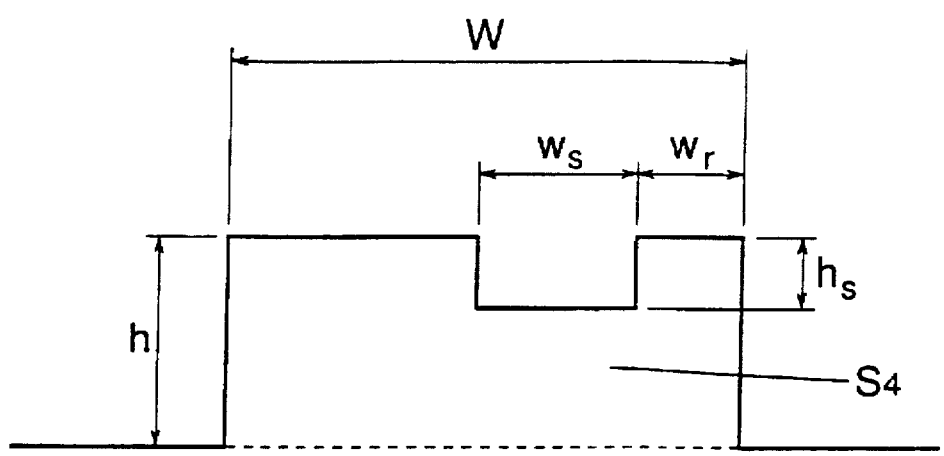
Figure 5A:
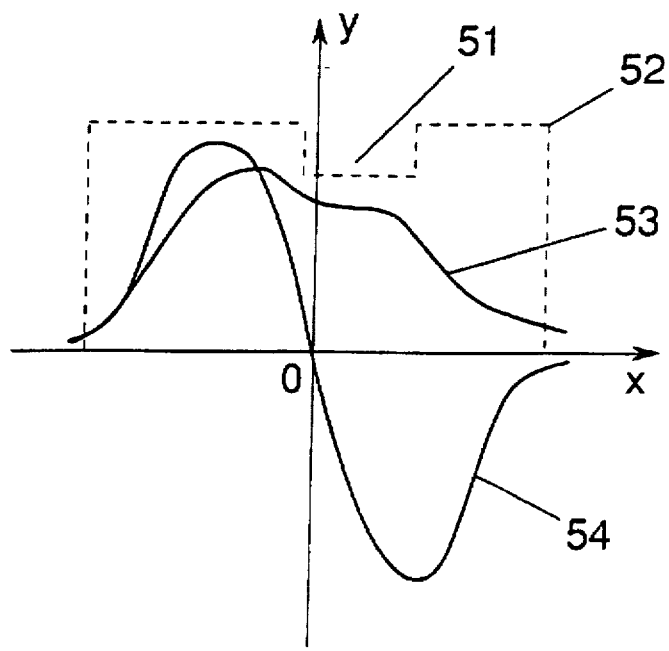
Figure 5B:
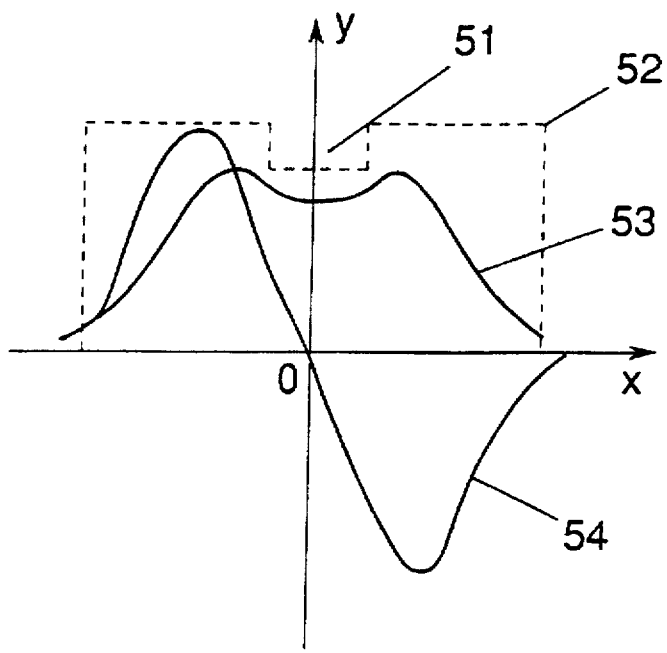
Figure 6:
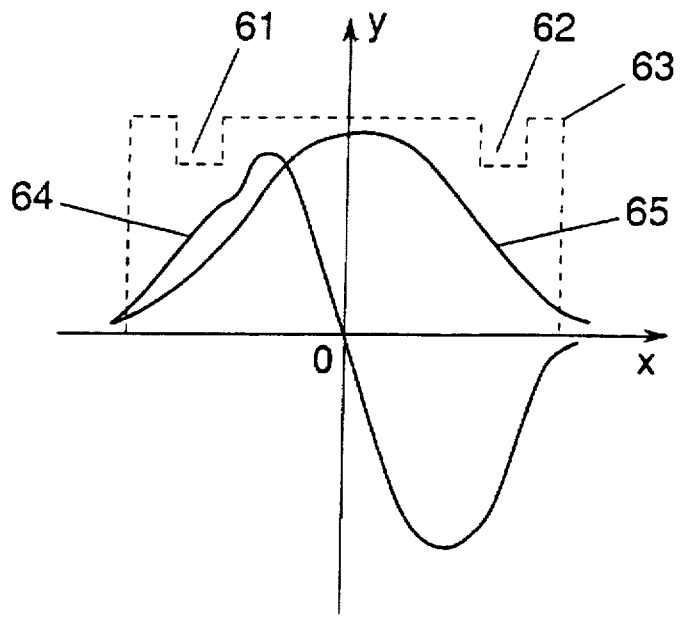
Figure 11:
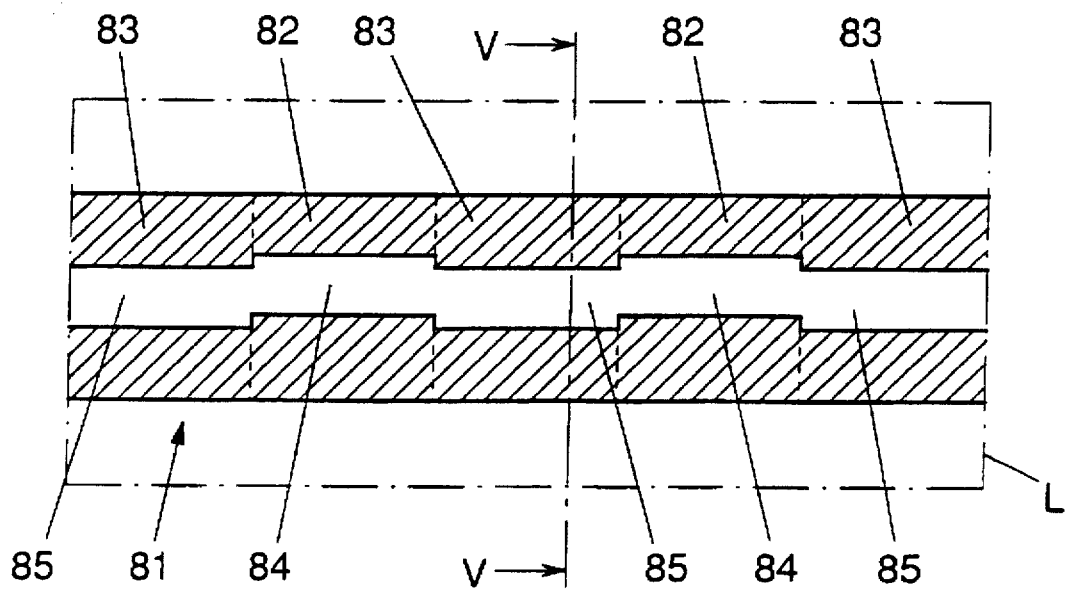
Figure 7:
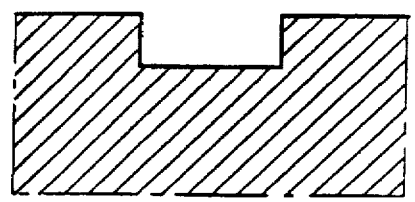
Figure 7:
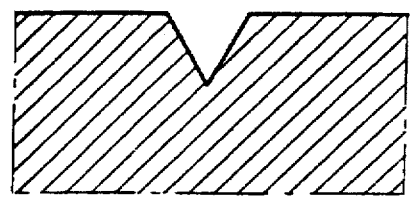
Figure 7:
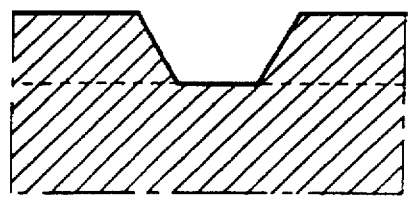
Figure 7:
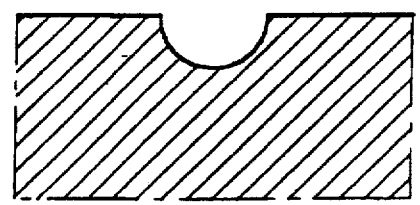
Figure 7:
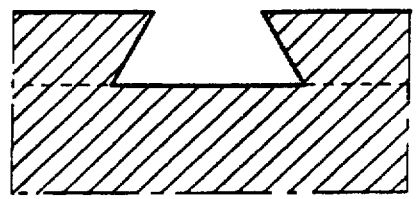
Figure 7:
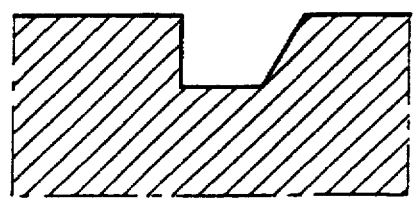
Figure 8:
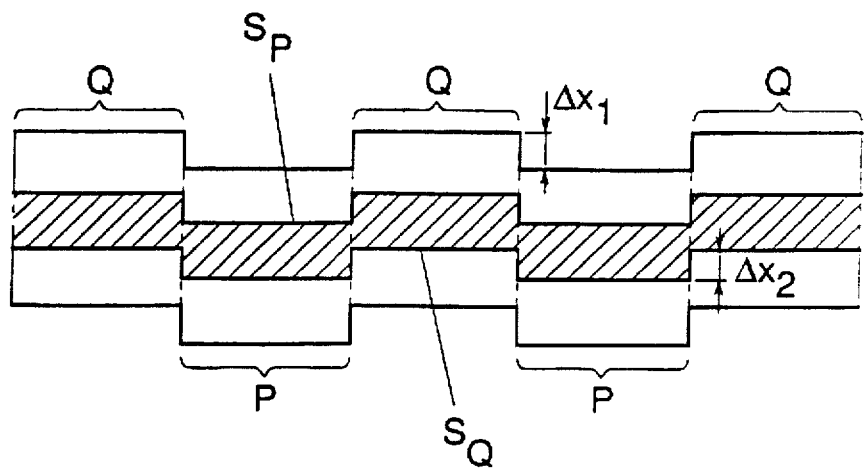
Figure 8:
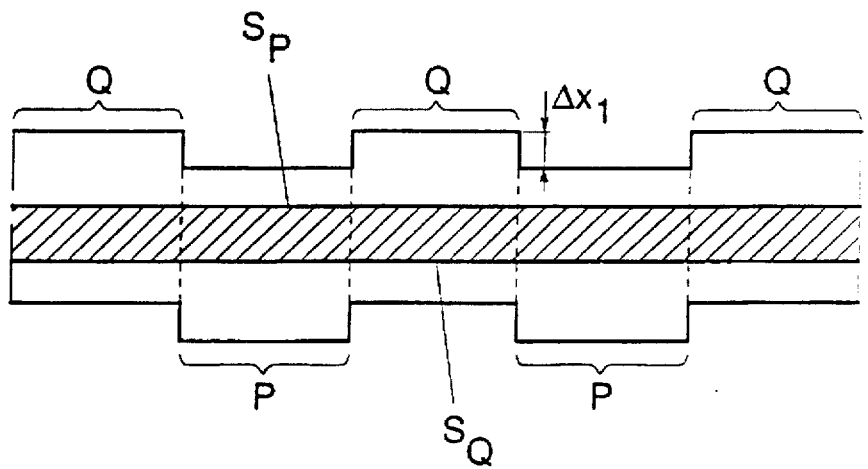
Figure 8:
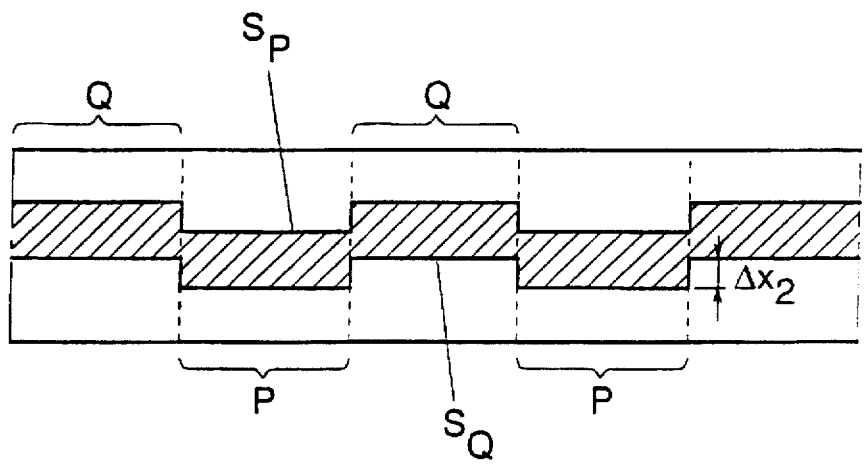
Figure 9:
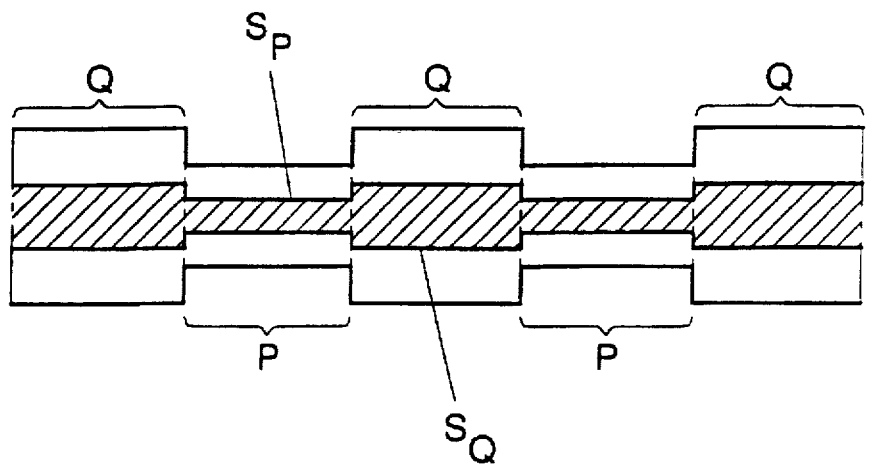
Figure 9:
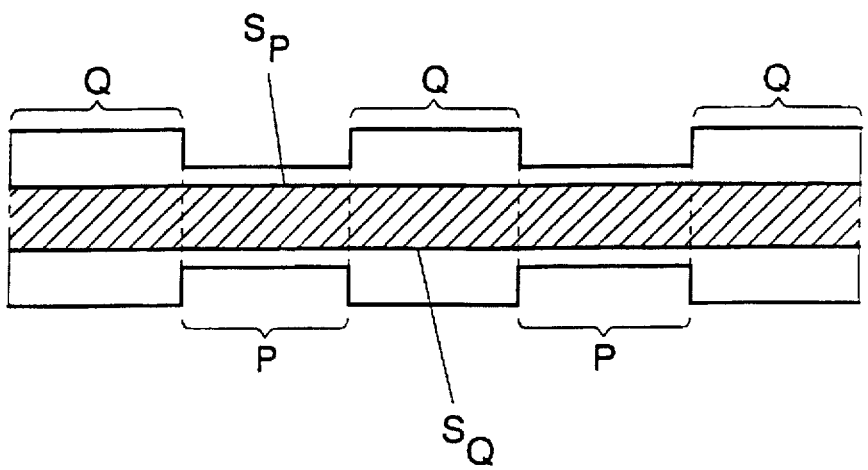
Figure 9:
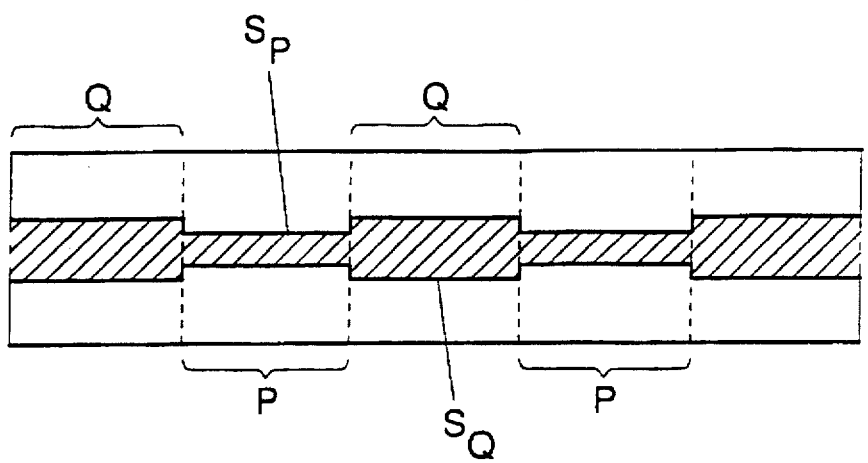
Figure 12A:
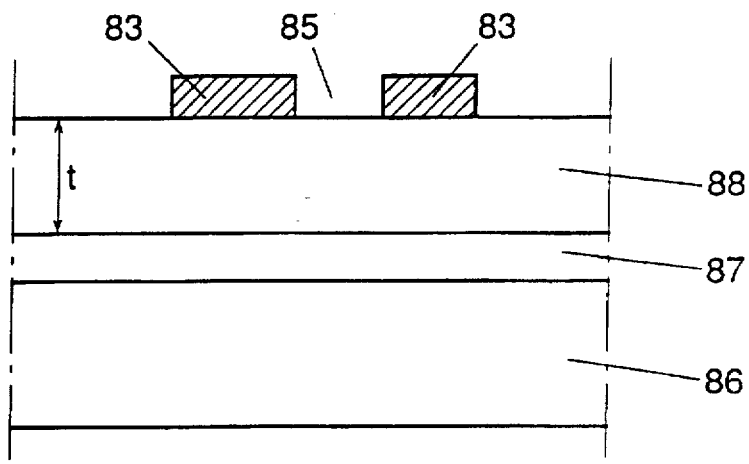
Figure 12B:
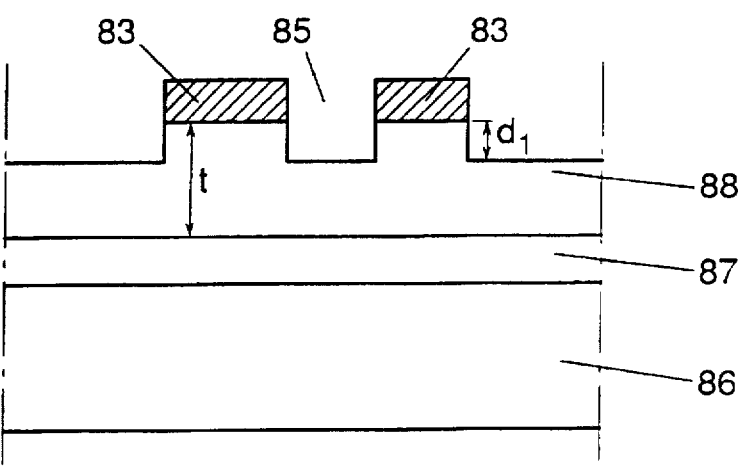
Figure 12C:
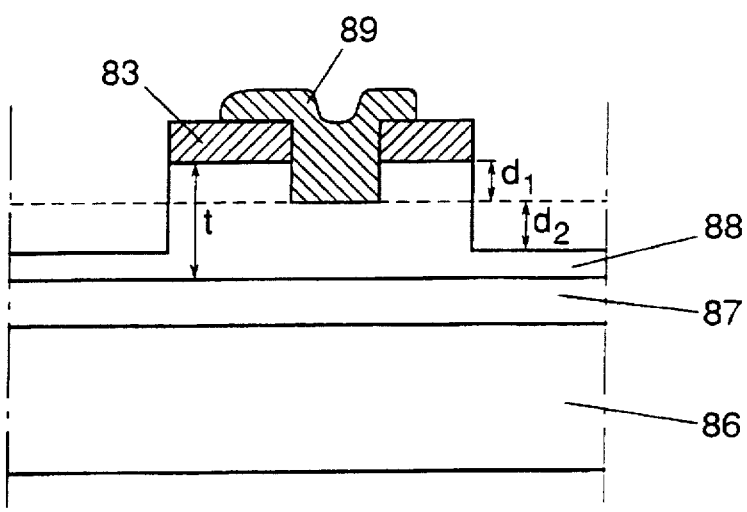
Figure 13:
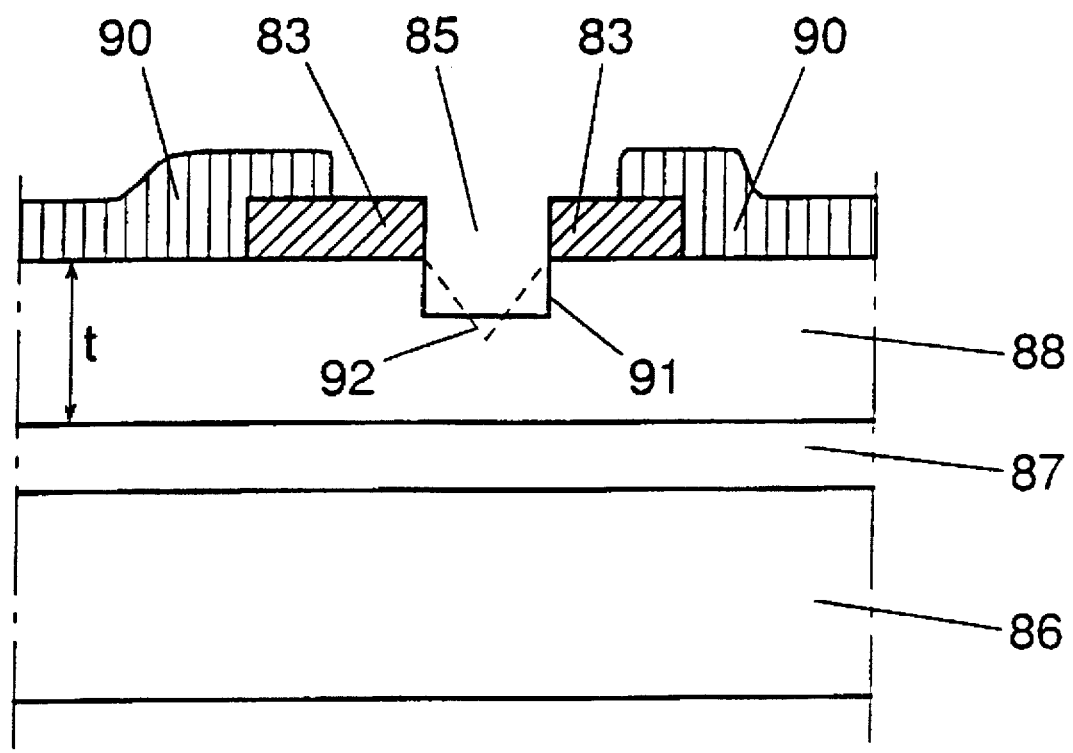

The invention will be further explained by means of the description of a number of exemplary embodiments, with reference being made to the drawings, wherein:

FIG. 1 shows, in a plan view, a diagrammatic presentation of a passive mode converter known per se;

FIG. 2 diagrammatically shows a known waveguide profile for the wave-guiding subsections P and Q of the mode converter shown in FIG. 1 in transverse section;

FIGS. 3a and 3b diagrammatically show the course of a field distribution of a fundamental and a first-order guided mode in a waveguide having a rectangular waveguide profile (FIG. 3a) and having a trapezium-shaped waveguide profile (FIG. 3b);

FIG. 4 shows a diagrammatic presentation of a waveguide profile according to the invention for the wave-guiding subsections P and Q of the mode converter according to FIG. 1 in transverse section;

FIGS. 5a and 5b diagrammatically show the course of a field distribution of a fundamental and a first-order guided mode in a waveguide having a waveguide profile as shown in FIG. 4 in a first variant (FIG. 5a) and in a second variant (FIG. 5b);

FIG. 6 diagrammatically shows the course of a field distribution of a fundamental and a first-order guided mode in a waveguide having a variant of the waveguide profile as shown in FIG. 4;

FIGS. 7(1)–7(6) respectively diagrammatically show variants for a partial profile of a waveguide profile as shown in FIG. 4;

FIGS. 8(1)–8(3) respectively show asymmetric variants for a concatenation of waveguiding subsections having waveguide profiles according to the invention;

FIGS. 9(1)–9(3) respectively show symmetric variants for a concatenation of waveguiding subsections having waveguide profiles according to the invention;

FIG. 10 shows a detail of the waveguide profile shown in FIG. 4;

FIG. 11 diagrammatically shows a plan view of a portion of a plate having a layered structure, on which a waveguide having a periodic structure according to the invention is realized, in a first stage of processing;

FIGS. 12a, 12b and 12c diagrammatically show transverse sections of the plate shown in FIG. 11, wherein FIG. 12a shows a transverse section in said first stage of processing along the line V—V in FIG. 11, wherein FIGS. 12b and 12c show a transverse section as in FIG. 12a, in a second and in a third stage of processing, respectively;

FIG. 13 shows a transverse section as in FIG. 12b in a variant stage for the said second stage of processing.

E. DESCRIPTION OF EXEMPLARY EMBODIMENTS

In FIG. 1, the general structure of a passive mode converter is diagrammatically shown in a plan view. As is disclosed in reference [1], said converter is composed of channel-shaped wave-guiding sections, namely, an input section A, an intermediary section B, and an output section C. The intermediary section B consists of an N-fold repetition of a pair of concatenated wave-guiding subsections P and Q having different wave-guiding profiles. The waveguide profile of a channel-shaped waveguide is understood to mean the geometry of the waveguide, including the optical properties of the wave-guiding medium and its surroundings. Every transition from a subsection P to a subsection Q, and vice versa, is referred to as interface. Let the subsections P and Q have mode-dependent propagation constants $b_{Pm}$ and $b_{Qm}$, respectively, in which the index m may have the values 1 and 2. Here, m=1 indicates the mode of which a fraction must be converted and m=2 the mode in which said conversion results. The lengths $L_P$ and $L_Q$ of the subsections P and Q are determined according to the expression $$L_P = p|b_{P1} - b_{P2}|^{-1} \text{ and } L_Q = p|b_{Q1} - b_{Q2}|^{-1} \quad (1)$$

and the number of repetitions N is determined according to the expression $$f_{12} = \sin^2(2C_{12} \star N) \quad (2)$$

where: $I_{12}$=the fraction of the intensity of the mode 1 present in the first subsection P which, after 2N couplings, upon transition from the Nth subsection Q to the section C, has been converted into mode 2; and $C_{12}$=the (amplitude-)coupling constant of the modes 1 and 2 in every interface.

When the mode converter converts a zero-order guided mode into a guided mode of higher order, e.g., the first order, the wave-guiding section A may be monomodal, while the sections P and Q are bimodal, trimodal, or generally multimodal. Preferably, between the section A and the first section P a taper is then applied, which forms a gradual transition from a monomodal channel-shaped waveguide to a multimodal waveguide, without it being possible for a coupling to occur such as the one in the transition between the sections P and Q.

A mode converter having the composition according to FIG. 1 may be simply realised in integrated form by means of strip-shaped elements which define the wave-guiding sections A and C, and the subsections P and Q of the intermediary section B, applied to, or in, a substrate provided with a light-conducting layer. Said strip-shaped elements may be of the type "raised strip" or "embedded strip", or they may form waveguides of the type "rib guide" or "strip-loaded guide" (see, e.g., reference [5]). The strip-shaped elements may basically be of different types but, with a view to the manufacture, may be chosen, e.g., to be of the same type having the same strip height. For the subsections of the mode converters disclosed in references [1] and [2], it is customary to choose strip-shaped elements having rectangular and/or trapezium-shaped cross sections. For briefness' sake, the waveguide profile of a waveguide which is defined by a strip-shaped element having a rectangular transverse section is referred to as a rectangular waveguide profile. In this manner, strip-shaped elements having a trapezium-shaped transverse section define a waveguide having a trapezium-shaped waveguide profile. FIG. 2 shows, in a transverse section, a rectangular waveguide profile of a channel-shaped waveguide of the type "raised strip" on a substrate S, possibly composed of a substrate layer $S_1$, a light-conducting layer $S_2$ of thickness $t_1$, and a buffer layer $S_3$ of thickness $t_2$. Said buffer layer is provided with a ridge-type elevation—the actual strip-shaped element $S_4$—as a result of which the waveguide of the type "raised strip" is defined. The strip-shaped element $S_4$ has a rectangular cross section having height h and width W. For a given height h, the width W to a significant extent determines with which guided modes a light signal may propagate in a channel-shaped waveguide defined by the strip-shaped element $S_4$. Should the width W be such that only a monomodal waveguide is formed, the waveguide only has the fundamental or zero-order mode (i.e., the mode having the order number zero) as guided mode of at least one of both polarisations TE and TM. As guided modes, a bimodal, a trimodal etc. waveguide, apart from these fundamental guided modes, also has guided modes of the first order (i.e., the order number one), the second order (i.e., the order number two) etc. Every guided mode of a light signal propagating in such a waveguide is accompanied by an electromagnetic field (e/m field). Viewed transversely to the direction of propagation, such an e/m field has a field distribution. The field distribution of a guided mode of a bimodal, or more generally of a multimodal, waveguide having an even order number typically differs from a field distribution of a guided mode having an odd order number. FIG. 3a shows this difference qualitatively. In a plane having a system of axes (x,y), there are shown a field distribution 31 of a zero-order mode and a field distribution 32 of a first-order mode of a light signal which propagates according to said modes in a waveguide having a rectangular waveguide profile 33 in a direction of propagation (z) perpendicular to the (x,y) plane (the plane of drawing). The field distribution 31 of the zero-order mode is symmetric with respect to the y-axis having an extreme value (in this case a maximum) on the y-axis, while the field distribution 32 is antisymmetric having a zero in the origin of the system of axes. This does not only apply to field distributions of the zero and first orders, but also more generally to field distributions of higher orders. That which applies to the zero order is representative here of guided modes having an even order number, and that which applies to the first order is representative of guided modes having an odd order number. Generally speaking, this also applies to waveguide profiles which have no axis of symmetry, such as the rectangle shown, and the field distributions to a greater or lesser extent will look deformed with respect to the symmetric case. Thus, as qualitatively shown in FIG. 3b for a waveguide profile 34 having the shape of a rectangular trapezium, as a result of an inclined side 35 present, both field distributions, namely, the one of the zero order 36 and of the first order 37, will look somewhat deformed, pushed away as it were from the inclined side towards the opposite side of the trapezium. Reference [2] discloses that, due to a suitable choice of trapezium-shaped profiles, possibly in combination with rectangular profiles, for the subsections P and Q a favourable effect on the coupling constants may be achieved. As a result of the typical difference between the field distributions having an even order number and an odd order number, it is possible to apply modifications in a portion of the waveguide profile in such a manner that substantially the field distribution of the even-order guided modes are affected (deformed), but not those of the odd-order guided modes, or vice versa. Simulations have shown that, by applying such modifying partial profiles to the waveguide profiles in the subsections P and Q, particularly in converters between two guided modes which differ in order, there may not only be achieved an increasing effect on the coupling constant, but in specific embodiments also a decreasing effect on the attenuation per interface. The partial profiles are applied to the waveguide profile in positions corresponding to zeros of the field distribution of the guided mode which should be affected as little as possible, or to extreme values of the field distribution of the guided mode which on the contrary must be affected as much as possible. A partial profile mainly affecting the field distribution of a specific guided mode may be realised in various ways, e.g., by way of one or more local, longitudinally-running deformations, such as a ridge-type elevation or a slot-shaped depression, of the strip-shaped element which defines a subsection P or Q. Instead of a ridge-type elevation in the material of the strip-shaped element, it is also possible to choose a narrow strip of another material having a suitable refractive index. The slot-shaped depression, too, may of course be filled with another material having a suitable refractive index. It has turned out that slot-shaped depressions have a more favourable effect than elevations. Since in addition slot-shaped depressions are simpler to realise lithographically, the partial profile is preferably constructed as one or more slot-shaped depressions over (at least a large portion of) the length of the strip-shaped elements.

In FIG. 4, there is shown a transverse section of a waveguide of the "raised-strip" type having (generally speaking) a rectangular waveguide profile 41 which is locally provided with a partial profile 42. The partial profile 42 comprises a slot-shaped depression 43, referred to as slot for short, in the ridge-type elevation which forms the strip-shaped element $S_4$ on the buffer layer $S_3$. FIG. 5a and FIG. 5b qualitatively show that the deforming effect of such a partial profile constructed as slot 51 of a rectangular waveguide profile 52 on the field distribution 53 of a zero-order guided mode is much greater than on the field distribution 54 of a first-order guided mode. FIG. 5a shows this for a slot positioned asymmetrically with respect to the y-axis, while FIG. 5b shows the same thing for a slot positioned symmetrically with respect to the y-axis.

FIG. 6 qualitatively shows the deforming effect of two slots 61 and 62 in a rectangular waveguide profile 63 on a field distribution 64 of a guided mode of the first order, while there is hardly any or no effect on a field distribution 65 of the zero-order guided mode.

For simplicity's sake, the description below is limited to examples in which a partial profile comprises only one slot. For a slot depending on the applied etching technique, various forms are possible. FIG. 7 (1)–7(6) respectively show six forms of this in transverse section. Consecutively there are shown: a rectangular transverse section (FIG. 7(1)) realisable with a dry-etching technique; a triangular transverse section (FIG. 7(2)) realisable with a wet-chemical etching technique in crystalline material at a suitable orientation; a trapezium-shaped transverse section (FIG. 7(3)) realisable with a wet-chemical etching technique in layered crystalline material at a suitable orientation; a round transverse section (FIG. 7(4)) realisable with a wet-chemical etching technique in material without crystalline structure; a trapezium-shaped transverse section (FIG. 7(5)) realisable as (FIG. 7(3)) at another orientation; and a rectangular trapezium as transverse section (FIG. 7(6)) realisable, e.g., in two etching steps, one with dry- and one with wet-chemical etching agents, in layered crystalline material at a suitable crystal orientation.

Subsections P and Q having a waveguide profile provided with a slot may connect to one another in various ways to form an intermediary section for a mode converter according to FIG. 1. For this purpose, FIG. 8(1)–8(3) respectively show, in plan view, three variants having asymmetric interfaces between consecutive subsections P and Q, while FIGS. 9(1)–9(3) respectively show three similar variants having symmetric interfaces. Each subsection P is provided with a slot $s_P$ and each subsection Q is provided with a slot $s_Q$. The variants of FIG. 8(1) and FIG. 9(1) show how, in every interface, both the subsections and the slot connect to one another discontinuously. Due to the double discontinuity in each interface, said variants are associated with a relatively high coupling factor, but equally a high attenuation. The variants of FIG. 8(2) and FIG. 9(2) show how, in each interface, the sections connect to one another discontinuously, while the slots without discontinuity blend into one another. With respect to similar converters having subsections without slots, said variants offer a relatively higher coupling factor at a constant attenuation per interface. Finally, the variants of FIG. 8(3) and FIG. 9(3) show how, in each interface, only the slots connect to one another discontinuously. These latter variants offer a relatively high coupling factor at a relatively low attenuation per interface.

Simulation results

With the help of a calculation method known under the name of "Film Mode Matching Method" (see reference [6]), several mode converters were simulated on the basis of a conventional InGaAsP/InP-layers structure and waveguide profiles for the subsections P and Q as shown in the figures FIG. 2 and FIG. 4. Here, the substrate layer $S_1$ and the buffer layer $S_3$ are made of InP, and the light-conducting layer $S_2$ of InGaAsP. For a light wavelength of 1.5 µm, InP has a refractive index of 3.1755 and InGaAsP a refractive index of 3.4027. The thickness of the light-conducting layer $t_1$ is 460 nm, and the thickness of the buffer layer $t_2$ is 250 nm. In FIG. 10, there is shown a more detailed transverse section of the strip-shaped element $S_4$ provided with the slot 43. Here, h=250 nm is the height and W=6.0 µm the width of the element $S_4$; and $h_S$ is the depth, while $w_S$=2.0 µm is the width of the slot 43. The slot has a distance $w_r$=1.5 µm to the edge of the strip-shaped element $S_4$. The waveguide profiles of the subsections P and Q have been chosen as each other's mirror image with respect to a (y,z) plane along a longitudinal direction of the strip-shaped elements which define the subsections P and Q, and perpendicular to the plane of the substrate.

In a following Table 1, for five 100% $TM_{00} \rightarrow TM_{01}$ mode converters there are shown simulation results relating to the coupling factor C (in radians), the attenuation D (in dB), and the number of interfaces n required for a 100% conversion. The results are shown in five rows, numbered from 1 to 5. The row 3 relates to results of a mode converter according to the variant of FIG. 8(2), with the subsections having an offset $\Delta x1 \neq 0$, and the slots having no offset ($\Delta x2=0$) connecting to one another (see FIG. 8(2) and having a slot depth $h_S \neq 0$. The rows 4 and 5 relate to results of mode converters according to the variant of FIG. 8(3), with the subsections connecting to one another with an offset $\Delta x1=0$, and the slots with an offset $\Delta x2 \neq 0$, and the slots having a different slot depth $h_S \neq 0$. The rows 1 and 2 as a comparison show results of the mode converters disclosed in reference [3]and reference [4]having subsections P and Q without slots. Such known mode converters are in fact converters according to the variant of FIG. 8(1) having offset $\Delta x1 \neq 0$, offset $\Delta x2=0$ and slot depth $h_S=0$.

As a comparison, the table for each converter, apart from the directly relevant coupling factor C for the $TM_{00} \rightarrow TM_{01}$ conversion, also includes the one for the $TE_{00} \rightarrow TE_{01}$ conversion. After all, it is of importance that particularly this conversion, to which the periodic structure of the converter is not tuned and for which therefore no positive interference takes place in the converter, be low, as a result of which its contribution towards signal attenuation in the converter remains limited. The coupling factors are distinguished from one another with the help of an additional column Pol., in which the relevant polarisation TE or TM is indicated.

TABLE 1

| $TM_{00} \leftrightarrows TM_{01}$ | Δx1 nm | Δx2 nm | $h_s$ nm | Pol. | C rad | D dB | n |
|---|---|---|---|---|---|---|---|
| 1 | 700 | 0 | 0 | TM | 0,2400 | 3,4 | 9 |
|   |     |   |   | TE | 0,1913 | 0,4 |   |
| 2 | 270 | 0 | 0 | TM | 0,0873 | 0,8 | 18 |
|   |     |   |   | TE | 0,0766 | 0,3 |   |
| 3 | 270 | 0 | 100 | TM | 0,1248 | 0,5 | 12 |
|   |     |   |   | TE | 0,0935 | 0,1 |   |
| 4 | 0 | 1000 | 50 | TM | 0,1545 | 0,2 | 10 |
|   |   |      |    | TE | 0,0698 | 0,1 |   |
| 5 | 0 | 1000 | 100 | TM | 0,1802 | 0,3 | 9 |
|   |   |      |     | TE | 0,0824 | 0,2 |   |

The Table shows (rows 1 and 2) that application of a relatively high offset between the subsections ($\Delta x1 \neq 0$) without slots does supply a high coupling factor for the desired TM conversion, but at the same time leads to high coupling losses. Furthermore, it turns out (row 3) that, if offset $\Delta x1 \neq 0$, the presence of slots has an increasing effect mainly on the coupling factor for the TM polarisation, while the attenuation decreases, particularly for the TE polarisation.

Finally, the Table shows (rows 4 and 5) that the application of slots ($h_S \neq 0$) without offset between the subsections ($\Delta x1=0$) leads both to high coupling factors for the desired TM conversion and to low coupling factors for the non-desired TE conversion and to a low total attenuation. This means that a 100% conversion may be achieved with a relatively small number of interfaces without high losses.

From the above, it is clear that converters with a markedly increased conversion yield may be realised by defining the intermediary waveguide by an elongated strip-shaped structure consisting of a periodic sequence of two strip-shaped elements per period, which are provided with slots running in the longitudinal direction. Here, the strip-shaped elements may differ in width and/or connect to one another with an offset. The realisation of such a structure with the strip-shaped elements having a transverse section as shown in FIG. 10, is now explained with reference to an example on the basis of indium phosphide. There is required a pair of etching steps which may both be carried out with a dry-etching process, particularly an RIE (Reactive Ion Etching) process.

In FIG. 11 there is shown, in a plan view, a portion of a plate L having a layered structure on which, according to a known technique, in a first step a first mask pattern 81 of a first mask material has been applied (right-oriented hatching), e.g., of silicon nitride (SIN). By way of example, the first mask pattern 81 has a pattern for a mode converter according to the variant of FIG. 8(3). The first mask pattern 81 has the shape of an elongated strip composed of a concatenation of strip-shaped elements 82 and 83. The strip-shaped elements 82 and 83 are provided with slot-shaped recesses 84 and 85, respectively. The strip-shaped elements 82 and 83, and the slot-shaped recesses 84 and 85 in the strip-shaped elements, have precisely determined dimensions, tuned to the eventual application of the waveguide to be realised having the desired periodic structure. FIGS. 12(a)–12(c) schematically show three stages of processing of the plate L in a transverse section. FIG. 12(a) shows, the plate in a first stage in a transverse section at the location of the line V—V in FIG. 11. The plate L has a layered structure. On a substrate layer 86, formed by a layer of crystalline InP, there have been applied, according to known techniques, two epitaxial layers, namely, a light-conducting layer 87 of InGaAsP and a top layer 88 of InP. On the top layer 88, there is located the mask pattern 81 having the strip-shaped elements 82 and 83 provided with the slot-shaped recesses 84 and 85. The top layer has an initial thickness t. In a first etching step with dry-chemical etching agents, the parts of the InP of the top layer 88 not covered by the first mask pattern 81 are etched over a depth $d_1$ (which is equal to the desired slot depth $h_S$). Said first etching step may be carried out, e.g., in an RIE process with a $CH_4/H_2$ gas mixture. FIG. 12(b) shows, in a similar way as in FIG. 12(a), the plate L in transverse section, this time however in a second stage following the first etching step.

Subsequently, the slot-shaped recesses 84 and 85 in the strip-shaped elements 82 and 83 of the first mask pattern 81—at any rate the parts of the InP of the top layer 88 in the slot-shaped recesses not covered by the first mask material of the first mask pattern 81—are covered by a second mask pattern 89 of a second mask material, e.g., photoresist lacquer. Subsequently, in a second etching step with dry-chemical etching agents, the parts of the InP of the top layer 88 not covered by the first mask material of the mask pattern 81 and the second mask material of the second mask pattern 89 are further etched over a depth $d_2$ (so that $d_1+d_2=h$, the desired height h for the strip-shaped element $S_4$ according to FIG. 4). FIG. 12(c) shows the plate L in transverse section in a third stage of processing following the execution of the second etching step. The second etching step may be chosen as a continuation of the first etching step. Finally, a cleaning step is carried out, in which the used mask materials are removed, silicon nitride, e.g., by HF and photoresist lacquer, e.g., by acetone. After cleaning, the plate L has a plan view according to the variant (3) of FIG. 8(3), while the subsections P and Q both have a waveguide profile as shown in FIG. 4. The manufacture of the other variants shown in FIGS. 8(1) and 8(2) and FIGS. 9(1) and 9(2) may be carried out in a similar manner with a mask pattern 81 adjusted in an analogous way.

Should it be impossible to carry out the profile desired for the slots $S_P$ and $S_Q$ with the same etching agents as the profile for the strip-shaped elements P and Q (such is the case, e.g., if the one must be carried out wet-chemically and the other with a dry-etching technique), there is first applied an auxiliary mask 90, e.g., of photoresist lacquer, which covers the InP parts of the top layer 88 on either side of the first mask pattern 81, but leaves the slot-shaped recesses in the first mask pattern 81 completely free. Subsequently, the first etching step is carried out. FIG. 13 shows the plate L in transverse section in a stage following the application of the auxiliary mask 90 and the execution of the first etching step. The slot 85, e.g., due to a dry-etching step has been given a rectangular cross section 91, or due to a wet-chemical etching step at a suitable crystal orientation of the InP of the top layer 88, a triangular profile 92 (dotted line). Thereafter, the auxiliary mask 90 is removed and the second mask 89 is applied in the same way as shown in FIG. 12(c), whereupon the second etching step follows, this time over a depth $d_1+d_2$. By applying the auxiliary mask 90 in a way as shown in FIG. 13, the etching processings of the first and the second etching steps may be carried out independently from one another.

The etching of the top layer 88 by way of the slot-shaped recesses 84 and 85 need not necessarily be carried out in one etching step. After the application of the first mask pattern 81 and of the auxiliary-mask pattern 90, all slot-shaped recesses 84, e.g., may first be covered by a first partial-mask pattern of a first partial-mask material (different from the mask materials of the first mask pattern 81 and of the auxiliary-mask pattern 90), whereafter, by way of the uncovered slot-shaped recesses 85, InP parts of the top layer 88 are etched by an etching agent suitable for a desired first slot profile, down to an etching depth desired for the first slot profile. Subsequently, the first partial-mask pattern is removed, and a similar second partial-mask pattern is applied to cover the slot-shaped recesses 85. Thereafter, InP parts of the top layer 88 are etched, by way of the uncovered slot-shaped recesses 84, by an etching agent suitable for a desired second slot profile, down to an etching depth fitting the second slot profile.

Thereafter, the auxiliary mask 90 is removed and all slot-shaped recesses 84 and 85 in the first mask pattern 81 are covered by a suitable mask material, e.g., the same material as that of the first mask pattern 81. In doing so, a stage of processing is reached in which no more than the profiles of the slots in the subsections P and Q have been realised. Such profiles only relate to partial profiles of the waveguide profiles of the subsections P and Q themselves. By applying a method as disclosed in reference [2], the subsections may subsequently be provided with waveguide profiles which are trapezium-shaped and/or rectangular, in accordance with the crystal orientation of the plate L initially chosen, and in a sequence to be suitably chosen.

I claim:

1. An integrated optical mode converter for converting a fraction of a signal component of a light signal propagating according to a first guided mode into a signal component propagating according to a second guided mode, with one of the two guided modes having an even order number and the other of the two guided modes having an odd order number, said integrated optical mode converter comprising:

a channel-shaped waveguide supported by a substrate, in which a periodic coupling takes place between the two guided modes of the light signal propagating in the waveguide, said waveguide comprising an incoming wave-guiding section, an intermediary wave-guiding section and an outgoing wave-guiding section, and said intermediary wave-guiding section comprising a periodic concatenation of two wave-guiding subsections per period, a length of the two wave-guiding subsections and a number of periods thereof being tuned to a desired fraction of conversion, wherein at least one of the two wave-guiding subsections has a waveguide profile including a partial profile which has a deforming effect on a field distribution of one of the two guided modes and which does not substantially affect a field distribution of the other one of the two guided modes.

2. The mode converter according to claim 1, wherein each of the two wave-guiding subsections has a waveguide profile which is substantially determined by a strip-shaped element having said partial profile, said strip-shaped element being provided with a slot running according to a longitudinal direction of the strip-shaped element of each of the two wave-guiding subsections.

3. The mode converter according to claim 1, wherein each of the two wave-guiding subsections has a waveguide profile including said partial profile, said waveguide profile being determined by a strip-shaped element provided with a slot running according to a longitudinal direction of the strip-shaped element of each of the two wave-guiding subsections.

4. The mode converter according to claim 3, wherein the strip-shaped elements connect to one another with an offset, and the slots thereof are in line.

5. The mode converter according to claim 3, wherein the strip-shaped elements are in line, and the slots thereof have an offset with respect to one another.

6. The mode converter according to claim 2, wherein the slots have a substantially rectangular transverse section.

7. The mode converter according to claim 2, wherein the slots have a substantially trapezium-shaped transverse section.

8. The mode converter according to claim 2, wherein the slots have a substantially triangular transverse section.

9. The mode converter according to claim 3, wherein the slots have different transverse sections.

10. The mode converter according to claim 3, wherein the strip-shaped elements mutually differ in transverse section, and the slots have mutually equal transverse sections and are in line.

11. The mode converter according to claim 3, wherein the strip-shaped elements have mutually equal transverse sections and are in line, and the slots have mutually different transverse sections.

12. The mode converter according to claim 1, wherein each of the two wave-guiding subsections is bimodal.

13. A method for manufacturing a channel-shaped waveguide on a substrate comprising a package of layers having a light-conducting layer, said waveguide comprising a concatenation of wave-guiding sections alternating with a first and a second waveguide profile substantially defined by strip-shaped elements of a first and a second type, respectively, with the strip-shaped elements of at least one of the two types being provided with a slot running in a longitudinal direction thereof, the method comprising the following steps:

(a) applying to the substrate a first mask pattern of a first mask material, said first mask pattern comprising mask parts corresponding to the strip-shaped elements of the first and the second type, and to the slots running in the strip-shaped elements of at least one of the two types, (b) etching, in a first etching operation, parts of the substrate not covered by any mask material, (c) covering up mask parts of the first mask pattern, which correspond to the slots running in the strip-shaped elements of at least one of the two types, with a second mask pattern of a second material, (d) etching, in a second etching operation, parts of the substrate not covered by any mask material.

14. The method according to claim 13, wherein the first and second etching operations are carried out with a same etching agent, with the parts of the substrate not covered by any mask material being etched in the first etching operation to a first etching depth, and in the second etching operation to a second etching depth.

15. The method according to claim 13, wherein, in a first intermediary step of the steps (a) and (b), an auxiliary-mask pattern of a further mask material is applied for covering the mask parts of the first mask pattern, which correspond to the strip-shaped elements of the first and of the second type, and for leaving uncovered the mask parts of the first mask pattern, which correspond to the slots running in the strip-shaped elements of at least one of the two types, and wherein, in a second intermediary step of the steps (b) and (c), the further mask material of the auxiliary-mask pattern is removed.

16. The method according to claim 15, wherein the strip-shaped elements of the two types are provided with a slot running in a longitudinal direction thereof, and wherein the first etching operation of the step (b) comprises the following substeps:

(b1) applying a first partial-mask pattern of a third mask material for covering mask parts of the first mask pattern, which correspond to the slots in the strip-shaped elements of the first type, (b2) etching, in a first partial-etching step, parts of the substrate not covered by any mask material, (b3) removing the first partial-mask pattern, (b4) applying a second partial-mask pattern of the third mask material for covering mask parts of the first mask pattern, which correspond to the slots in the strip-shaped elements of the second type, (b5) etching, in a second partial-etching step, parts of the substrate not covered by any mask material.

17. A channel-shaped waveguide manufactured in accordance with the method of claim 13, wherein said channel-shaped waveguide is provided on a substrate comprising a package of layers having a light-conducting layer, said waveguide comprises a concatenation of wave-guiding sections alternating with a first and a second waveguide profile substantially defined by strip-shaped elements, and at least one of said strip-shaped elements is provided with a slot running in a longitudinal direction thereof so that at least one of the wave-guiding subsections has a waveguide profile including a partial profile which has a deforming effect on a field distribution of one of two guided modes of a propagated light signal and which does not substantially affect a field distribution of the other one of the two guided modes.

18. The mode converter according to claim 3, wherein the slots have a substantially rectangular transverse section.

19. The mode converter according to claim 4, wherein the slots have a substantially rectangular transverse section.

20. The mode converter according to claim 5, wherein the slots have a substantially rectangular transverse section.

21. The mode converter according to claim 3, wherein the slots have a substantially trapezium-shaped transverse section.

22. The mode converter according to claim 4, wherein the slots have a substantially trapezium-shaped transverse section.

23. The mode converter according to claim 5, wherein the slots have a substantially trapezium-shaped transverse section.

24. The mode converter according to claim 3, wherein the slots have a substantially triangular transverse section.

25. The mode converter according to claim 4, wherein the slots have a substantially triangular transverse section.

26. The mode converter according to claim 5, wherein the slots have a substantially triangular transverse section.

27. The mode converter according to claim 4, wherein the slots have different transverse sections.

28. The mode converter according to claim 5, wherein the slots have different transverse sections.

29. A channel-shaped waveguide manufactured in accordance with the method of claim 14, wherein said channel-shaped waveguide is provided on a substrate comprising a package of layers having a light-conducting layer, said waveguide comprises a concatenation of wave-guiding sections alternating with a first and a second waveguide profile substantially defined by strip-shaped elements, and at least one of said strip-shaped elements is provided with a slot running in a longitudinal direction thereof so that at least one of the wave-guiding subsections has a waveguide profile including a partial profile which has a deforming effect on a field distribution of one of two guided modes of a propagated light signal and which does not substantially affect a field distribution of the other one of the two guided modes.

30. A channel-shaped waveguide manufactured in accordance with the method of claim 15, wherein said channel-shaped waveguide is provided on a substrate comprising a package of layers having a light-conducting layer, said waveguide comprises a concatenation of wave-guiding sections alternating with a first and a second waveguide profile substantially defined by strip-shaped elements, and at least one of said strip-shaped elements is provided with a slot running in a longitudinal direction thereof so that at least one of the wave-guiding subsections has a waveguide profile including a partial profile which has a deforming effect on a field distribution of one of two guided modes of a propagated light signal and which does not substantially affect a field distribution of the other one of the two guided modes.

31. A channel-shaped waveguide manufactured in accordance with the method of claim 16, wherein said channel-shaped waveguide is provided on a substrate comprising a package of layers having a light-conducting layer, said waveguide comprises a concatenation of wave-guiding sections alternating with a first and a second waveguide profile substantially defined by strip-shaped elements, and at least one of said strip-shaped elements is provided with a slot running in a longitudinal direction thereof so that at least one of the wave-guiding subsections has a waveguide profile including a partial profile which has a deforming effect on a field distribution of one of two guided modes of a propagated light signal and which does not substantially affect a field distribution of the other one of the two guided modes.

* * * * *